United States Patent
Kane et al.

(10) Patent No.: US 12,459,638 B2
(45) Date of Patent: Nov. 4, 2025

(54) PITCH DROP FRICTION BRAKE

(71) Applicant: Lockheed Martin Corporation, Bethesda, MD (US)

(72) Inventors: Tyler Christian Kane, Fairfield, CT (US); Kevin A. Laitenberger, Beacon Falls, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 72 days.

(21) Appl. No.: 18/369,751

(22) Filed: Sep. 18, 2023

(65) Prior Publication Data

US 2025/0091712 A1  Mar. 20, 2025

(51) Int. Cl.
*B64C 27/48* (2006.01)
*B64C 27/32* (2006.01)

(52) U.S. Cl.
CPC ............ *B64C 27/48* (2013.01); *B64C 27/322* (2013.01)

(58) Field of Classification Search
CPC ....... B64C 27/322; B64C 27/48; B64C 27/50; B64C 24/327; B64C 27/33; B64C 27/35; B64C 27/37; B64C 27/39; B64C 27/43; B64C 27/45; B64C 27/51; B64C 27/52; B64C 27/54; B64C 27/653; B64F 1/125; B64F 1/22

See application file for complete search history.

(56) References Cited

U.S. PATENT DOCUMENTS

| | | | | |
|---|---|---|---|---|
| 3,153,455 A | * | 10/1964 | Mosinskis | B64C 27/50 416/142 |
| 3,484,175 A | * | 12/1969 | Vacca | B64C 27/50 416/143 |
| 4,349,317 A | | 9/1982 | Desjardins | |
| 5,951,252 A | * | 9/1999 | Muylaert | B64C 27/39 416/107 |
| 10,494,090 B2 | * | 12/2019 | Owens | B64C 27/33 |
| 11,370,532 B2 | | 6/2022 | Bowles et al. | |
| 2008/0101934 A1 | * | 5/2008 | Stamps | B64C 27/33 416/134 A |
| 2014/0241886 A1 | * | 8/2014 | Sutton | B64C 27/35 416/141 |

* cited by examiner

*Primary Examiner* — Joshua J Michener
*Assistant Examiner* — Cindi M Curry
(74) *Attorney, Agent, or Firm* — Foley & Lardner LLP

(57) ABSTRACT

A rotor system of a rotary wing aircraft includes a rotor hub including a hub arm, a rotor blade rotatably coupled to the hub arm about a longitudinal axis of the hub arm, and a first brake assembly. The first brake assembly includes a rod coupled to the rotor blade coupling and a brake shoe coupled to the rod. The brake shoe is configured to apply a force on the hub arm. An axial position of the rod is adjustable to vary the force of the brake shoe on the hub arm.

19 Claims, 6 Drawing Sheets

PITCH DROP FRICTION BRAKE

STATEMENT REGARDING FEDERALLY SPONSORED RESEARCH OR DEVELOPMENT

This invention was made with U.S. Government support under Agreement No. W9124P-19-9-0001 awarded by the Army Contracting Command-Redstone Arsenal to the AMTC. The Government has certain rights in the invention.

FIELD

The present invention relates generally to the field of pitch control for rotor blades of rotary wing aircraft.

BACKGROUND

During flight, the pitch of rotor blades of a rotary wing aircraft can be controlled by pitch control actuators and swashplates in a pitch control system. When the rotary wing aircraft lands and the rotors and pitch control actuators are deactivated, the rotor blades may pitch due to the weight of the deactivated actuators, as well as their own weight.

SUMMARY OF THE INVENTION

As noted above, the rotor blades of a rotary wing aircraft can pitch due to the weight of the deactivated actuators and their own weight when the aircraft is static on the ground and the actuators are deactivated. This in turn can cause the rotor swashplates to settle outside the control volume of the pitch control actuators. When the pitch control actuators are reactivated for a subsequent flight, the pitch control actuators may quickly pull the swashplate back into the control volume, which can cause a sudden vibration that can be experienced in the cockpit. Further, extreme blade pitch conditions can lead to increased blade loads and can cause rotor rotation in the event of high wind gusts, which may cause pitch and roll forces on the aircraft.

Certain designs use elastomeric bearings that resist pitch change of the rotor blade when the rotor system and the pitch control actuators are deactivated. However, a tension-torsion strap as utilized in exemplary non-limiting embodiments of the present disclosure are lighter in weight than those with elastomeric bearings. The lighter weight promotes improved performance and efficiency of the aircraft. The tension-torsion strap may also provide lower torsional resistance than the elastomeric bearing, which may reduce control loads.

The present disclosure describes a friction brake system for a rotor blade of a rotary wing aircraft that restricts pitch change of the rotor blade when the rotor system and the pitch control actuators are deactivated. The rotor blade may be coupled to a hub arm of the rotor hub by a tension-torsion strap that provides the centripetal force to retain the rotor blades in position when the rotor is rotating. The tension-torsion strap provides some torsional stiffness that resists the pitching of the rotor blade, but may not provide sufficient torsional stiffness to resist the pitching of the blade due to gravity (e.g., pitch drop) when the rotor is not rotating and the pitch control actuators are deactivated.

The pitch drop may increase in response to vibration of the surface on which the aircraft is supported. For example, if the rotary wing aircraft is being towed by a tow motor across a flight field, additional pitching of the rotor blades may occur due to bumps in the surface of the flight field. The rotor blade may settle in a pitch position in which the swashplate is pulled out of the control volume of the pitch control actuators. When the pitch control actuators are reactivated, the pitch control actuators may quickly pull the swashplate and the rotor blades back into the control volume, causing vibration that can be felt in the cockpit. The swashplates may also contact other components of the aircraft when pulled outside the control volume, leading to friction and other undesirable effects.

In some cases, ground support equipment (GSE) may be used to stop the rotor blades from pitching under their own weight when the rotor and pitch control actuators are deactivated. However, this requires large pieces of equipment that need to be moved under each rotor blade each time the rotary wing aircraft lands and the rotors and pitch control actuators are deactivated. In some cases, such GSE may not be available at the location that the aircraft lands. Further, the GSE may interfere with control checks of the pitch control system. For example, the GSE may need to be removed each time the control checks are performed. Further, the blade pitch may increase the difficulty of installing the GSE with the pitch control actuators deactivated.

The friction brake systems of the present application include one or more friction brake assemblies that apply a frictional force within the blade retention system to resist the pitching of the blade when the rotor and pitch control actuators are deactivated. When the rotor is reactivated, the tension-torsion strap stretches due to the centrifugal force, and the brake assemblies disengage from the rotor blade. Thus, the friction brake assemblies may only provide sufficient force to restrict the pitching of the rotor blade when the rotor is not rotating.

In an exemplary aspect, a rotor system of a rotary wing aircraft is provided. The rotor system includes a rotor hub including a hub arm, a rotor blade coupling rotatably coupled to the hub arm about a longitudinal axis of the hub arm, and a first brake assembly. The first brake assembly includes a rod coupled to the rotor blade coupling and a first brake shoe coupled to the rod, the first brake shoe configured to apply a force on the hub arm. An axial position of the rod is adjustable to vary the force of the first brake shoe on the hub arm.

In another exemplary aspect, a rotary wing aircraft is provided. The rotary wing aircraft includes a rotor system including a rotor hub with a hub arm, a rotor blade coupling configured to pitch about a longitudinal axis of the hub arm, a tension-torsion strap coupling the rotor blade to the hub arm, a swashplate assembly comprising a plurality of pitch control actuators configured to control the pitch of the rotor blade, an engine or motor configured to rotate the rotor system, wherein the rotation of the rotor system is configured to lift the rotary wing aircraft, and one or more brake assemblies. Each of the one or more brake assemblies includes a rod coupled to the rotor blade coupling and a brake shoe coupled to the rod. The brake shoe is configured to apply a force on the hub arm to resist a pitch change of the rotor blade coupling. An axial position of the rod is adjustable to vary the force of the brake shoe on the hub arm.

In another exemplary aspect, a method of controlling pitch drop of a rotor blade coupled to a rotor hub of rotary wing aircraft by a tension-torsion strap and a rotor blade coupling is provided. The method includes coupling a brake assembly to the rotor blade coupling, the brake assembly including a rod coupled to a brake shoe, and adjusting an axial position of the rod such that the brake shoe applies a force on the rotor hub, the force configured to resist pitch drop of the rotor blade.

It will be recognized that the figures are the schematic representations for purposes of illustration. The figures are provided for the purpose of illustrating one or more implementations with the explicit understanding that the figures will not be used to limit the scope of the meaning of the claims.

DETAILED DESCRIPTION

Figure 1:
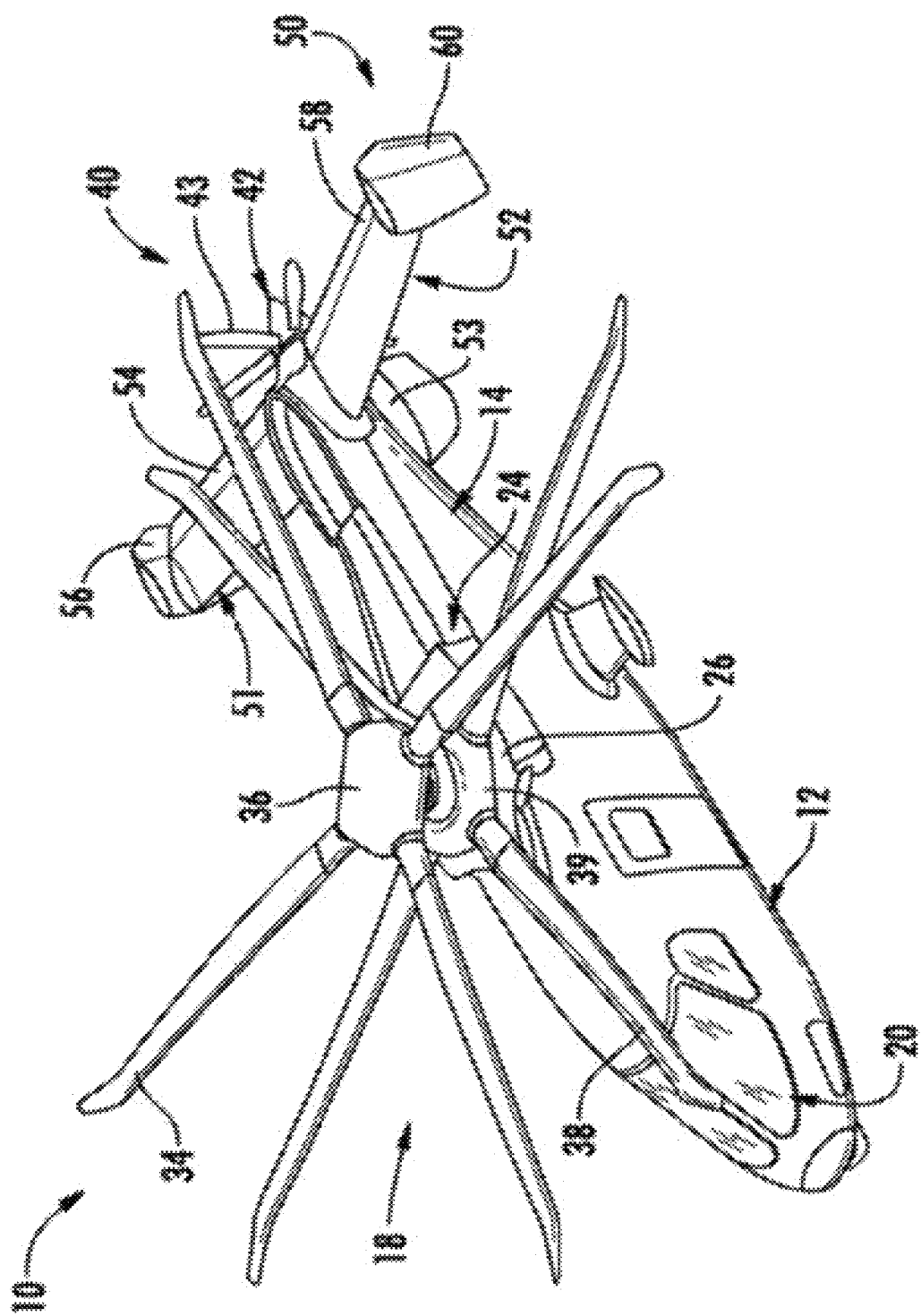
FIG. 1 is a perspective view of a rotary wing aircraft.

FIG. 1 is perspective view of a rotary wing aircraft in accordance with some embodiments. More particularly, FIG. 1 depicts an exemplary aircraft as shown and described in U.S. Pat. No. 11,370,532, which is incorporated by reference herein in its entirety for the overall aircraft system shown therein and construction thereof. FIG. 1 depicts an exemplary embodiment of a rotary wing, vertical takeoff and landing (VTOL) aircraft 10.

Aircraft 10 includes an airframe or fuselage 12 having a plurality of surfaces with an extending tail 14. A coaxial main rotor assembly 18 is located at the fuselage 12 and rotates about a main rotor axis, A. In an exemplary embodiment, the fuselage 12 includes a cockpit 20 having seats for flight crew (e.g., pilot and co-pilot) and passengers. Main rotor assembly 18 is driven by a power source, for example, one or more engines 24, via a gearbox 26. Main rotor assembly 18 includes an upper rotor assembly 28 that may be driven in a first direction (e.g., counterclockwise) about the main rotor axis, A, and a lower rotor assembly 32 that may be driven in a second direction (e.g., clockwise) about the main rotor axis, A, opposite to the first direction (i.e., counter rotating rotors). Upper rotor assembly 28 includes a first plurality of rotor blades 34 supported by a first or upper rotor hub 36. Lower rotor assembly 32 includes a second plurality of rotor blades 38 supported by a second or lower rotor hub 39.

In some embodiments, aircraft 10 may include a translational thrust system 40 having a propulsor assembly 42 or a propeller located at extending tail 14 to provide translational thrust (forward or rearward) for aircraft 10. Propulsor assembly 42 includes a plurality of propulsor blades 43. Although a particular aircraft configuration is illustrated in this non-limiting embodiment, other configurations may be employed (e.g., although the dual rotor system is depicted as coaxial, embodiments include dual rotor aircraft having non-coaxial rotors). Propulsor assembly 42 or translational thrust system 40 is connected to and driven by the engine 24 via the gearbox 26. In accordance with another aspect of an exemplary embodiment, extended tail 14 includes a tail section 50 including starboard and port horizontal stabilizers 51 and 52. Tail section 50 also includes a vertical stabilizer 53 that extends downward from extending tail 14. Starboard horizontal stabilizer 51 includes a starboard active elevator 54 and a starboard active rudder 56. Similarly, port horizontal stabilizer 52 includes a port active elevator 58 and a port active rudder 60. Elevators 54 and 58 and rudders 56 and 60 act as controllable surfaces, e.g., surfaces that alter a flight path/characteristics of aircraft 10.

Figure 2:
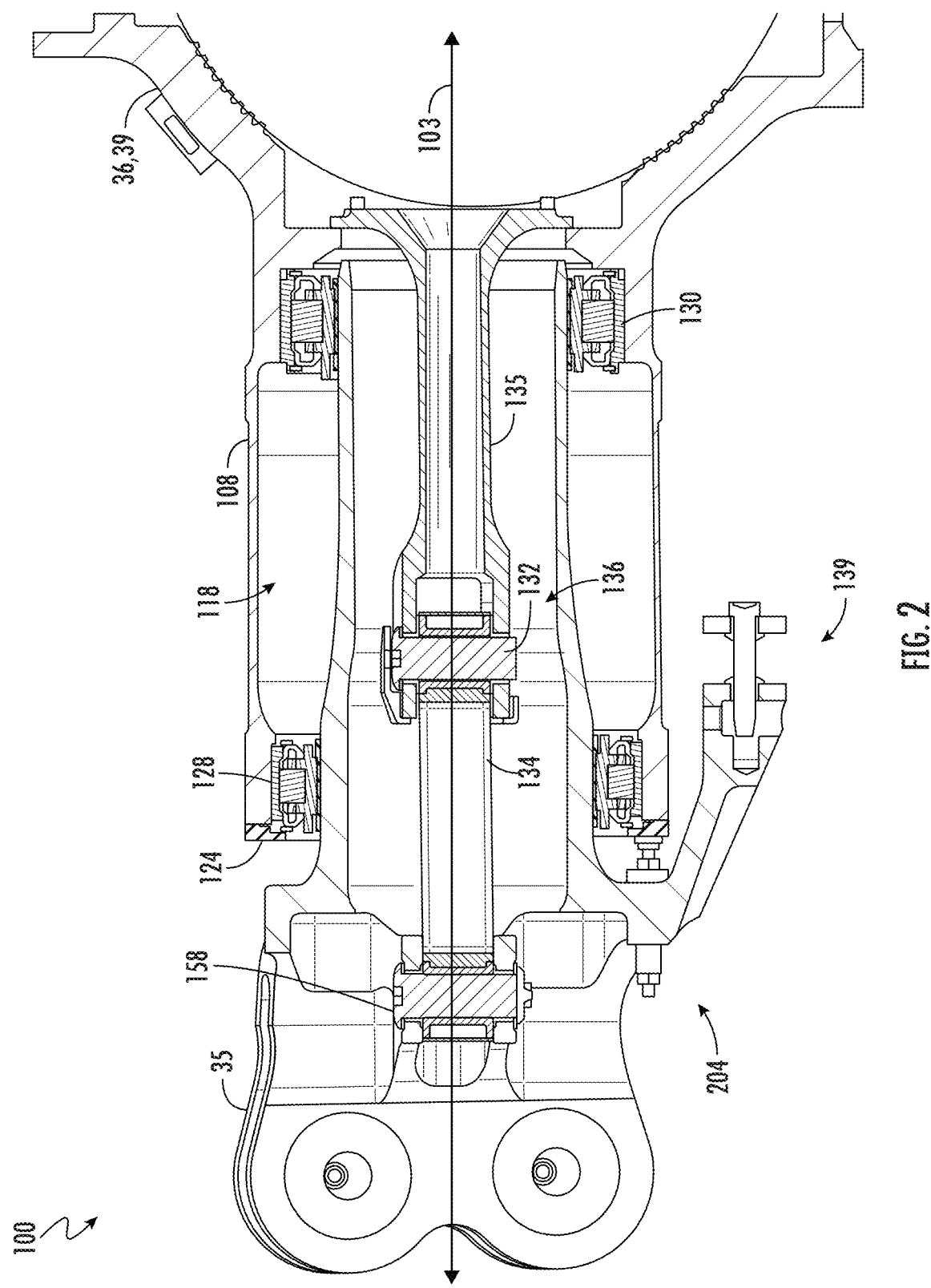
FIG. 2 is a section view of a rotor blade retention assembly of the rotary wing aircraft of FIG. 1, according to some embodiments.

FIG. 2 shows a cross-sectional view of a rotor blade retention assembly 100, according to some embodiments. Each rotor blade 34, 38 may be coupled to the rotor hub 36, 39 by a rotor blade retention assembly 100. The rotor blade retention assembly 100 may include a pitch cuff 35 (e.g., a rotor blade coupling) that may be directly coupled to a rotor blade 34, 38. In each rotor blade retention assembly 100, an inboard end of the pitch cuff 35 may extend at least partially into the hub arm inner cavity 118 of the hub arm 108. The inboard end of the pitch cuff 35 may be substantially cylindrical, and the hub arm inner cavity 118 may be substantially cylindrical. A pair of bearings 128, 130 may be positioned around the inboard end of the pitch cuff 35 to rotatably couple the pitch cuff 35 to the hub arm 108 and enable rotation of the pitch cuff 35 relative to the hub arm 108, about an axis of the hub arm 108 (e.g., a longitudinal axis 103 of the hub arm 108 extending in the direction of the tip of the rotor blade 34, 38, a pitch axis, a feathering axis, etc.). The rotation of the pitch cuff 35 about the longitudinal axis 103 of the hub arm 108 changes the pitch angle of the rotor blade 34, 38. A tension-torsion strap 134 may extend through a portion of a pitch cuff inner cavity 136 of the pitch cuff 35. The tension-torsion strap 134 may be coupled to the pitch cuff 35 by an outboard blade pin 158 and to an outboard end of an extender 135 by an inboard blade pin 132. The extender 135 may be coupled at its inboard end to the hub 36, 39. The tension-torsion strap 134 may provide tensile centripetal force to keep the pitch cuff 35 and the rotor blade 34, 38 coupled to the rotor hub 36, 39 when the rotor hub 36, 39 is rotating. The tension-torsion strap 134 also provides torsional stiffness to resist the rotation of the rotor blade 34, 38 about the longitudinal axis 103 of the hub arm 108. A bearing retainer 124 may be positioned around the outboard end of the hub arm to retain the outboard bearing 128 and create a seal between the hub arm inner cavity 118 and the environment. The position of a pitch control horn 139 of the pitch cuff 35 may be controlled by a pitch control rod to rotate the pitch cuff 35 about the longitudinal axis 103 of the hub arm 108 to adjust the pitch of the rotor blade 34, 38.

Figure 3:
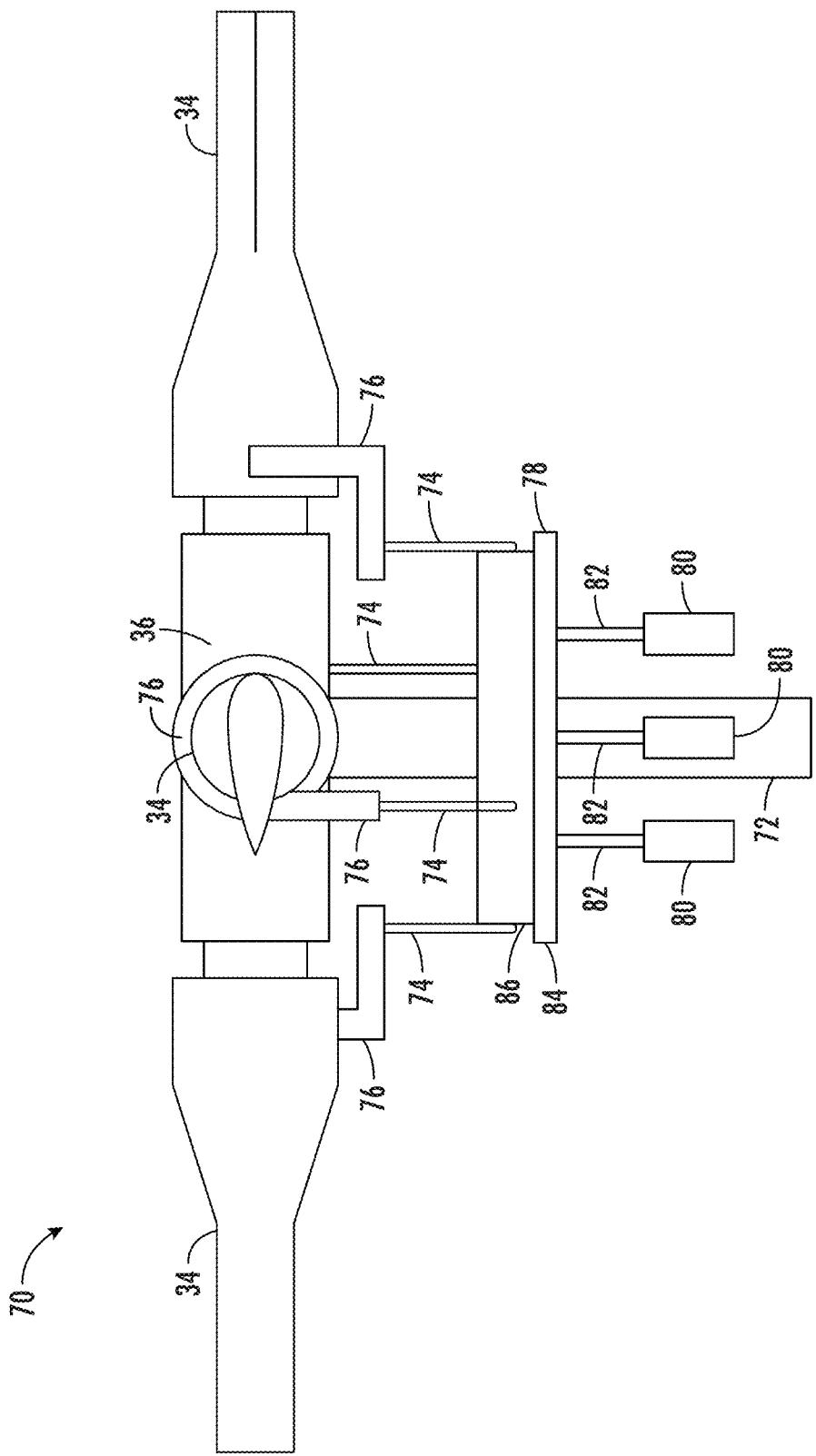
FIG. 3 is a schematic illustration of a pitch control system of the rotary wing aircraft of FIG. 1, according to some embodiments.

FIG. 3 is a schematic illustration of a pitch control system 70 for the aircraft 10, according to some embodiments. The rotor blades 34, 38 of the aircraft 10 are coupled to the hub arms 108 of the rotor hub 36, 39. The rotor hub 36, 39 may be coupled to a motor, engine, or gearbox via the rotor shaft 72, which transmits torque from the motor, engine, or gearbox to the rotor hub 36, 39 to rotate the rotor hub 36, 39 and blades 34, 38. The rotor blades 34, 38 may each be coupled to a pitch control rod 74 via a pitch control horn 76 (e.g., similar to the pitch control horn 139). As shown in FIG. 3, the pitch control rods 74 are coupled to the pitch control horns 76 on the trailing edge side of the roots of the rotor blades 34, 38. In some embodiments, the pitch control rods 74 may be coupled to the pitch control horns 76 on the leading edge side of the roots of the rotor blades 34, 38.

The pitch control rods 74 are coupled on their respective opposite ends to a swashplate 78. As shown in FIG. 3, when the swashplate 78 is moved upward, the pitch control rods 74 push upward on the pitch control horns 76, lifting the trailing edge of the rotor blades 34, 38 and causing downward pitch of the blades 34, 38 rotate about the respective hub arm 108 axes. When the swashplate 78 is moved downward, the pitch control rods 74 pull down on the pitch control horns 76, lowering the trailing edge of the rotor blades 34, 38 and causing upward pitch of the blades 34, 38 as the rotor blades 34, 38 rotate about the respective hub arm 108 axes.

The position of the swashplate 78 may be controlled by pitch control actuators 80 coupled to the swashplate by pitch control rods 82. For example, there may be three pitch control actuators 80 positioned around the rotor shaft 72 at intervals of 120 degrees, four pitch control actuators 80 positioned around the rotor shaft 72 at intervals of 90 degrees, etc. Each pitch control actuator 80 may control the position of the respective pitch control rod 82 to control the position of the swashplate. The pitch control actuators 80 may be, for example, hydraulic actuators, electromechanical actuators, servo motors, etc. The pitch control actuators 80 may be controlled based on inputs from the flight controls. For example, an operator of the aircraft may operate the collective flight control of the aircraft 10, and the pitch control actuators 80 may all simultaneously extend or retract the pitch control rod 82 to raise or lower the swashplate 78. The operator may operate the cyclic flight control to cause one or more of the pitch control actuators 80 to extend or retract the respective pitch control rod 82 to a greater or lesser extend than one or more of the other pitch control actuators 80, causing the swashplate 78 to tilt. The swashplate 78 may include a nonrotating portion 84 rotatably coupled to a rotating portion 86. When the swashplate 78 is tilted, the pitch of each rotor blade 34, 38 may vary over the course of each rotation of the rotor hub 36, 39. In some embodiments, other types of motors or actuators may be used to adjust the pitch of the rotor blades 34, 38.

When the aircraft 10 is static on the ground and the pitch control actuators 80 are deactivated (e.g., when hydraulic pressure is not supplied to hydraulic pitch control actuators, etc.), the weight of the swashplate 78 and other components of the pitch control system 70 may pull down on the pitch control horns 76. This may cause the trailing edges of the rotor blades 34, 38 to drop and the rotor blades 34 to pitch upward. The sagging of the trailing edges of the rotor blades 34, 38 may be referred to as pitch drop. Further, as shown in FIG. 3, the rotor blades 34, 38 may not be symmetrical about a vertical plane extending through the hub arm 108 axis. In some embodiments, the center of mass of the rotor blade 34, 38 may be aft (relative to the airflow over the blade 34, 38) of the hub arm 108 axis. When the pitch control system 70 is active, the pitch control actuators 80 support the swashplate 78 such that the swashplate 78 does not pull down on the blades under the force of gravity. However, when the aircraft 10 is static on the ground and the pitch control actuators 80 are deactivated, the force of gravity on the rotor blades 34, 38 and the swashplate 78 pulling on the rotor blades 34, 38 may cause additional pitch drop. The torsional stiffness of the tension-torsion strap 134 may be insufficient to resist the pitching of the blades 34, 38 due to gravity.

In some cases, the pitch control rods 82 may be pulled out of the control volume of the pitch control actuators 80 (e.g., beyond the most lowered or retracted position that the pitch control actuators 80 are configured to move the pitch control rods). When the pitch control actuators 80 are reactivated, they may cause the pitch control rods 82 to quickly jump to a controlled position within the control volume. This can cause undesirable vibration and stress on the components of the aircraft 10. It should be understood that while the examples discussed herein refer to the sagging of the trailing edge of the rotor blades 34, 38, in some embodiments, the leading edges of the blades 34, 38 may sag under gravity, resulting in a downward pitch of the blades 34, 38. For example, if the pitch control rods 74 are coupled to the leading edge of the rotor blade 34, 38, the leading edge, rather than the trailing edge, may sag due to the weight of the swashplate 78 pulling on the pitch control horn 76.

Figure 4:
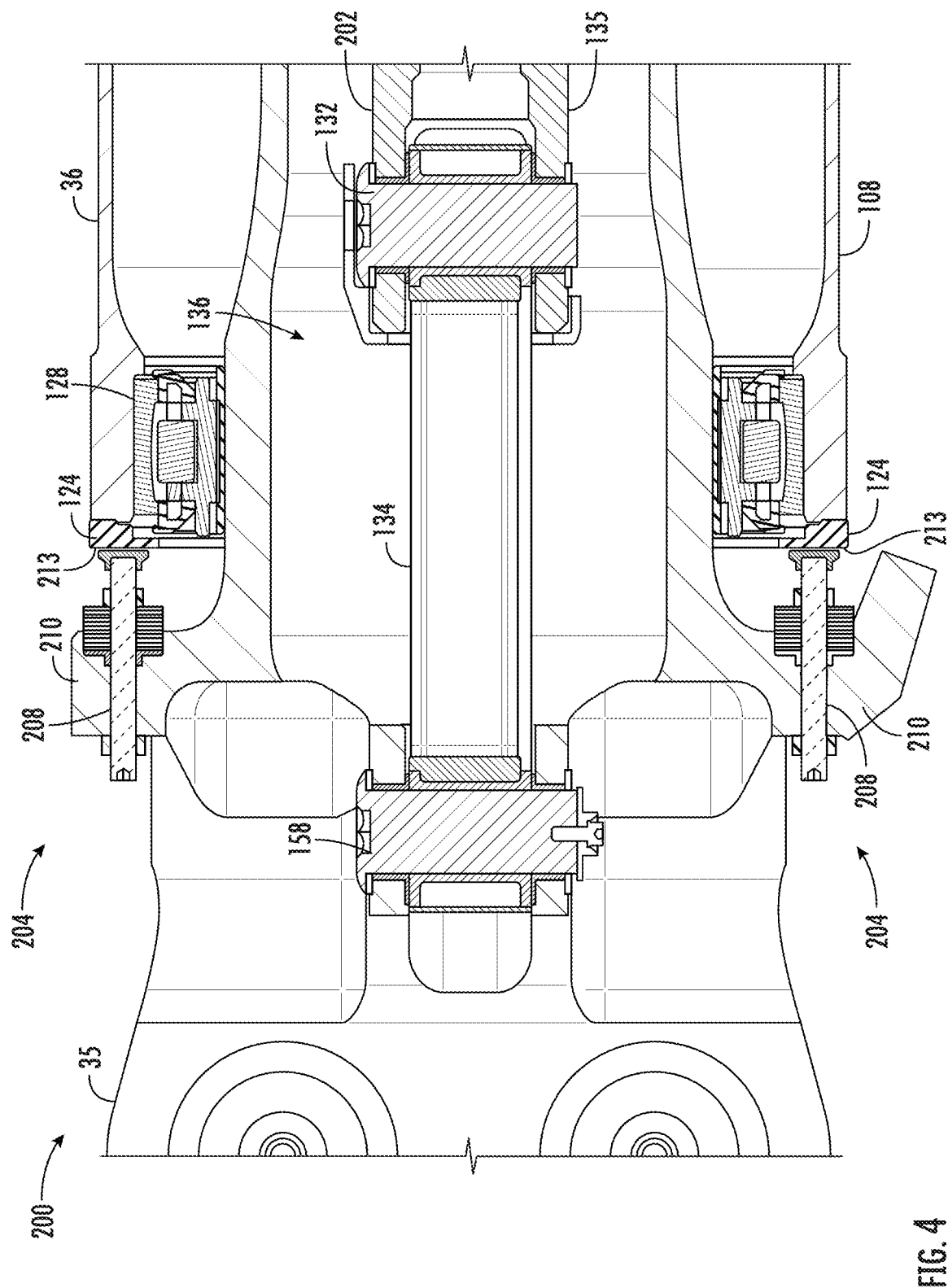
FIG. 4 is a section view of a root end of a rotor blade of the rotary wing aircraft of FIG. 1, including a pitch drop friction brake system, according to some embodiments.
Figure 5:
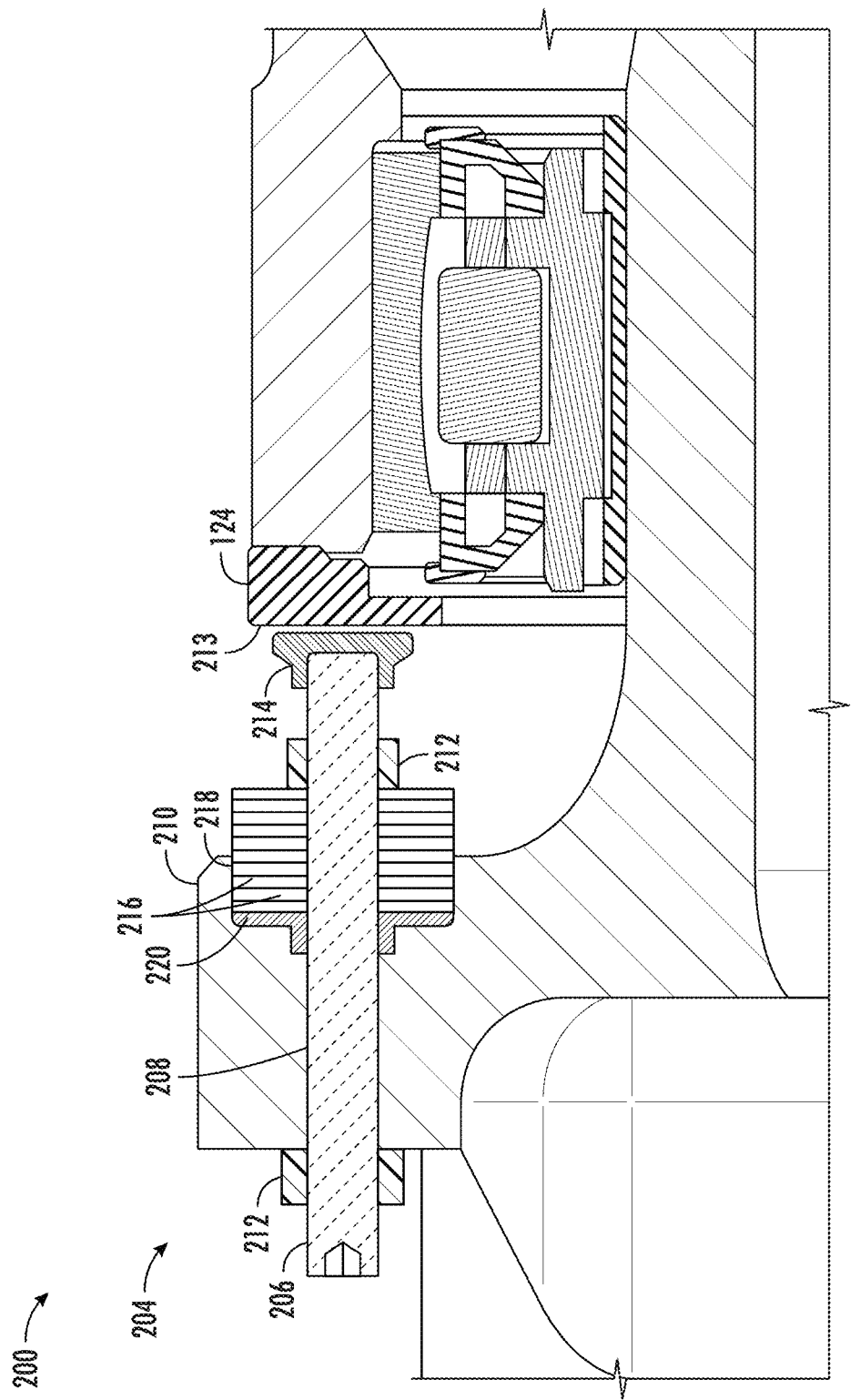
FIG. 5 is a section view of a brake assembly of the pitch drop friction brake system of FIG. 4, according to some embodiments.

Referring now to FIGS. 4 and 5, a pitch drop friction brake system 200 is shown, according to some embodiments. The brake system 200 is configured to resist pitch drop when the rotor 36, 39 is not spinning and the pitch control actuators 80 are deactivated. FIG. 4 shows a cross-sectional view of the pitch cuff 35 coupled to a hub arm 108 via a tension-torsion strap 134. The tension-torsion strap 134 is coupled to an extender 135 coupled to the hub 36, 39 that extends into the pitch cuff inner cavity 136. The inboard blade pin 132 couples the tension-torsion strap 134 to the inner member 202 of the hub arm 108, while the outboard blade pin 158 couples the tension-torsion strap 134 to the pitch cuff 35. The inner member 202 may extend out of the outboard end of the pitch cuff 35 and be coupled to the rotor hub 36, 39. The pitch cuff 35 may be coupled to the root end of the rotor blade 34, 38. The body of the rotor blade 34, 38 and the rotor pitch cuffs 35 may collectively be referred to as a rotor blade or a rotor blade assembly.

The brake system 200 may include one or more brake assemblies 204 coupled to a flange 210 of the pitch cuff 35. The brake assemblies 204 may be configured to apply pressure (e.g., force) on the hub arm 108, for example, on an end face 213 of the hub arm 108 (which may be defined by the bearing retainer 124) or another surface of the hub arm 108 to create a frictional force to resist the rotation of the rotor blade 34, 38 about the axis of the hub arm 108 to reduce or prevent pitch drop. The end face 213 may be a vertically oriented face at the outboard end of the hub arm 108. The threaded rod 206 may extend perpendicularly (e.g., horizontally) toward the end face 213 such that a face of the brake shoe 214 contacts the end face 213. The force applied by the brake shoe 214 on the end face 213 may cause a frictional force that resists the rotation of the rotor blade 34, 38. As shown in FIG. 5, two brake assemblies 204 apply pressure to an outboard surface of the bearing retainer 124 at the top and bottom of the hub arm 108. In some embodiments, the brake assemblies 204 may be positioned in other locations, and the brake system may include more or fewer brake assemblies 204. For example, the brake system 200 may include five brake assemblies 204 positioned at approximately 72-degree intervals around the flange 210. The brake assemblies 204 may be positioned at regular or irregular intervals around the flange 210.

References herein to the positions of elements (e.g., "top," "bottom," "above," "below," etc.) are used to describe the orientation of various elements as they would be arranged on the aircraft 10 when the aircraft is resting on level ground. For example, the rotor blades 34, 38 are "above" the fuselage 12, and the upper rotor hub 36 is at the "top" of the aircraft 10. It should be noted that the orientation of various elements may differ according to other exemplary embodiments, and that such variations are intended to be encompassed by the present disclosure.

FIG. 5 shows a cross-sectional view of the upper brake assembly 204 of the pitch drop friction brake system 200 of FIG. 4 in further detail. The brake assemblies 204 may include a rod 206 coupled to the rotor hub 36, 39. A brake shoe 214 may be coupled to the rod. The brake shoe 214 may be configured to apply a force to the hub arm 108 to resist the pitching of the rotor blade 34, 38 due to the force of gravity (e.g., pitch drop) when the rotor 36, 39 is not rotating and the pitch control actuators 80 are deactivated. In the embodiment shown in FIG. 5, the rod 206 is a threaded rod that extends through an opening 208 (e.g., a hole) in a flange 210 of the pitch cuff 35. A nut 212 may be coupled to (e.g., threaded onto) the threaded rod 206 on each side of the flange 210. The axial position of the threaded rod 206 may be adjusted by turning the nuts 212. For example, a technician may use an open-ended wrench to turn the nuts 212 which may cause the threaded rod 206 to move towards or away from the hub arm 108. In some embodiments, the rod 206 may be partially or completely unthreaded. For example, the rod 206 may be a component of an electromechanical or hydraulic actuator, and the axial position of the rod 206 may be adjusted via electrical and/or hydraulic controls.

The brake shoe 214 may be coupled to (e.g., threaded onto) the outboard end of the threaded rod 206. The brake shoe 214 may have a flat surface that contacts the bearing retainer 124. The force applied by the brake shoe 214 on the hub arm 108 can be adjusted (e.g., varied) by adjusting the axial position of the rod 206. For example, by turning the nuts 212 to move the threaded rod 206 closer to the bearing retainer 124, the pressure applied by the brake shoe 214 may be increased. The pressure applied by the brake shoe 214 can be reduced by turning the nuts 212 to move the threaded rod 206 farther away from the bearing retainer 124. In some embodiments, one or more spring washers 216 (e.g., disc spring washers, Belleville disc springs, wave springs, etc.) may be positioned between the flange 210 and the inboard nut 212. The spring washers 216 may help control the pressure applied by the brake shoe 214 on the bearing retainer 124 by compressing as the rod 206 is moved towards the hub arm 108. At least one of the washers 216 may be positioned within a counterbore 218 in the flange 210, such that the washers 216, the inboard nut 212, and the brake shoe 214 can fit within the gap between the flange 210 and the bearing retainer 124. The counterbore 218 may also reduce the overall weight of the rotor 36, 39. The brake assembly 204 may include a flanged bushing 220 positioned between the flange 210 (e.g., the bottom of the counterbore 218).

In some embodiments, the opening 208 in the flange 210 may be a close tolerance hole with a diameter slightly larger than the outer diameter of the threaded rod, such that the threaded rod 206 contacting the opening 208 may more effectively react the shear force of the hub arm 108 on the brake shoe 214. In some embodiments, a sleeve may be positioned between the opening 208 and the rod 206. In some embodiments, the portion of the threaded rod 206 that extends through the flange 210 may be unthreaded, with only the ends of the threaded rod 206 being threaded. In some embodiments, the opening 208 may be a threaded hole that the threaded rod 206 is threaded into. For example, the threaded rod 206 may be a screw with a head that can be engaged with a wrench or other tool to thread the threaded rod 206 into the opening 208 and adjust the axial position of the rod 206. In such an embodiment, the brake assembly 204 may omit nuts 212, or may include one or more nuts 212 acting as locknuts that may be tightened against the flange 210 to hold the threaded rod 206 in an axial position.

In some embodiments, the brake shoe 214 may be threaded to the end of the threaded rod 206. In some embodiments, the brake shoe 214 may be coupled to the threaded rod using other means including fasteners, press fitting, snap fitting, etc. or a combination of any of the foregoing. In some embodiments, the threaded rod 206 may be coupled to the brake shoe 214 by a ball joint, such that the brake shoe 214 may swivel relative to the threaded rod 206 to account for any misalignment (e.g., non-perpendicularity) between the threaded rod 206 and the bearing retainer 124. In some embodiments, the bearing retainer may include a hardened coating or may be made from a hardened material to reduce wear on or deformation of the bearing retainer 124 from the brake shoe. In some embodiments, the brake shoe 214 may also include a hardened coating or be made from a hardened material. In some embodiments, the brake shoe 214 or the surface of the brake shoe 214 that contacts the bearing retainer 124 may be a high-friction, softer material, such as nitronic 60 or an aluminum nickel bronze. Thus, the brake shoe 214 may itself wear due to friction while causing less wear on the bearing retainer 124.

By turning the nuts 212 to adjust the position of the threaded rod 206, the compressive force of the brake shoe 214 on the bearing retainer 124 can be adjusted. Moving the threaded rod 206 toward the bearing retainer 124 increases the compressive force of the brake shoe 214 on the bearing retainer 124, while moving the threaded rod 206 away from the bearing retainer 124 reduces the compressive force of the brake shoe 214 on the bearing retainer 124. When the brake assemblies 204 are installed in their respective openings 208, the rotor blades 34, 38 may be supported by ground support equipment (GSE) to stop the blades 34, 38 from pitching due to the weight of the swashplate 78 pulling on the pitch control horn 76. The GSE may include scaffolding or other structure extending from the ground to the rotor blades 34, 38, as well as padded surfaces that can contact the blades 34, 38 without damaging (e.g., scratching, denting, etc.) the blades 34, 38. With the rotor blades 34, 38 supported by the GSE, the brake assemblies 204 may be installed in the respective openings. The nuts 212 may be turned until the brake shoes 214 contact the bearing retainer 124. The GSE may then be removed, if the rotor blades 34, 38 still pitch due to the weight of the swashplate 78 pulling on the pitch control horn 76, the rotor blades may be returned to a neutral position, the GSE may be repositioned to support the rotor blades in, and threaded rod 206 may be moved closer to the rotor blade 34, 38 by turning the nuts to increase the force of the brake shoe 214 on the bearing retainer 124. The GSE may again be removed to determine if the force of the brake shoe 214 on the bearing retainer 124 is sufficient to stop the rotor blades 34, 38 from pitching due to the weight of the swashplate 78 pulling on the pitch control horn 76. This process may be repeated until the rotor blades 34, 38 do not pitch due to the weight of the swashplate 78 pulling on the pitch control horn 76 (e.g., due to the force of gravity). In some embodiments, the pressure applied by the brake assemblies 204 may be set based on a predetermined torque applied to the threaded rod 206. The torque may be checked and adjusted periodically to ensure the pressure applied is sufficient to resist pitch drop.

When the rotors 36, 39 are not rotating, the tension-torsion straps 134 may have an unstretched length that allows the brake shoe 214 to contact the hub arm 108. The unstretched length is an initial, unexpanded length of the tension-torsion straps 134 (e.g., as manufactured and not in use) and may be referred to as a default length. At the unstretched length, each rod 206 may be positioned at an axial distance from the hub arm 108 (e.g., in a first position) such that the brake shoes 214 contact the hub arm 108 with enough force such that the brake assemblies 204 and the tension-torsion straps 134 cooperate to resist the pitch drop of the rotor blades 34, 38. For example, the brake assemblies and the tension-torsion straps 134 may cooperate to limit the pitch drop to below 1 degree, 5 degrees, 10 degrees, or another amount of pitch drop. When the rotors 36, 39 are not rotating and the pitch control actuators 80 are deactivated, the tension-torsion straps 134 may not have sufficient torsional stiffness to resist a pitch drop of more than 1 degree, 5 degrees, 10 degrees, 25 degrees or another amount of pitch drop without the additional friction supplied by the brake assemblies 204. For example, each rod 206 may be positionable in a first axial position in which the brake shoes 214 do not contact the hub arm 108. When the rods 206 are in the first axial position, the pitch drop of the rotor blade may exceed a predetermined angle (e.g., 1 degree, 5 degrees, 10 degrees, etc.) due to the weight of the swashplate 78 pulling on the pitch control horn when the pitch control actuators 80 are deactivated and the rotor system (e.g., including the rotors 36, 39) is not rotating. The rods 206 may also be positionable second axial position in which the brake shoes 214 contact the hub arm 108, and the brake shoes 214 and tension-torsion strap 134 cooperate to maintain the pitch drop of the rotor blade 34, 38 below the predetermined angle under the force of gravity causing the swashplate 78 to pull on the pitch control horn when the pitch control actuators 80 are deactivated and the rotor system is not rotating. When the rods 206 are in the second axial position and the rotor system is rotating, the tension-torsion strap 134 may expand such that the brake shoes 214 do not contact the hub arm 108 or do not significantly increase control loads due to friction on the hub arm 108.

When the rotors 36, 39 are spinning, the centrifugal force on the hub arm 108 is reacted by the tension-torsion strap 134. The tensile force on the tension-torsion straps 134 causes the tension-torsion straps 134 to stretch to a plurality of elongated (expanded) lengths longer than the default lengths, depending on the rotational speed of the rotors 36, 39. As the tension-torsion straps 134 stretch, the rotor blades 34, 38 move outboard relative to the rotor hubs 36, 39. The movement of the rotor blades 34, 38 affects whether the brake shoe 214 retains or loses contact with the bearing retainer 124. For example, the rotor blades 34, 38 may move sufficiently outboard such that the brake shoe 214 loses contact with the bearing retainer 124 without adjusting the axial positions the rods 206 (e.g., with each rod 206 still in the first position), thus eliminating the frictional force resisting the pitching of the blades 34, 38. In some embodiments, the brake shoe 214 may not lose contact with the bearing retainer 124. Instead, the force of the brake assemblies 204 on the bearing retainers may be reduced due to the increased distance between the bearing retainers 124 and the flange 210, thus reducing the frictional force resisting the pitching of the blades 34, 38. With the frictional force of the brake assemblies eliminated or reduced, the pitch control actuators 80 can control the pitch of the rotor blades 34, 38 with minimal or no resistance from the brake assemblies 204. It is possible that, in installing the brake assemblies 204, the threaded rod 206 may be positioned such that the force of the brake assemblies 204 on the hub arm 108 is higher than desired, even when the rotors 36, 39 are rotating and the tension-torsion straps 134 are stretched. This may increase the control loads on the pitch control actuators 80 (or other pitch control actuators) and in some cases, may damage the threaded rod 206.

The brake assemblies 204 are installed and adjusted such that they resist the pitching of the rotor blades 34, 38 under gravity. The rotors 36, 39 may be activated, and the controlling the pitch of the rotor blades 34, 38 may be tested with the aircraft 10 on the ground. If the loads on the pitch control actuators 80 are too high, the brake assemblies 204 may be adjusted to move the threaded rod 206 farther away from the bearing retainer 124 to reduce the force of the brake assemblies 204 on the hub arms 108. Thus, the positions of the threaded rods 206 can be adjusted such that the brake assemblies 204 apply sufficient force when the rotors 36, 39 are not rotating to resist pitching of the rotor blades 34, 38 due to gravity, while applying no force or a relatively low amount of force when the rotors 36, 39 are rotating to reduce the loads on the pitch control actuators 80.

Figure 6:
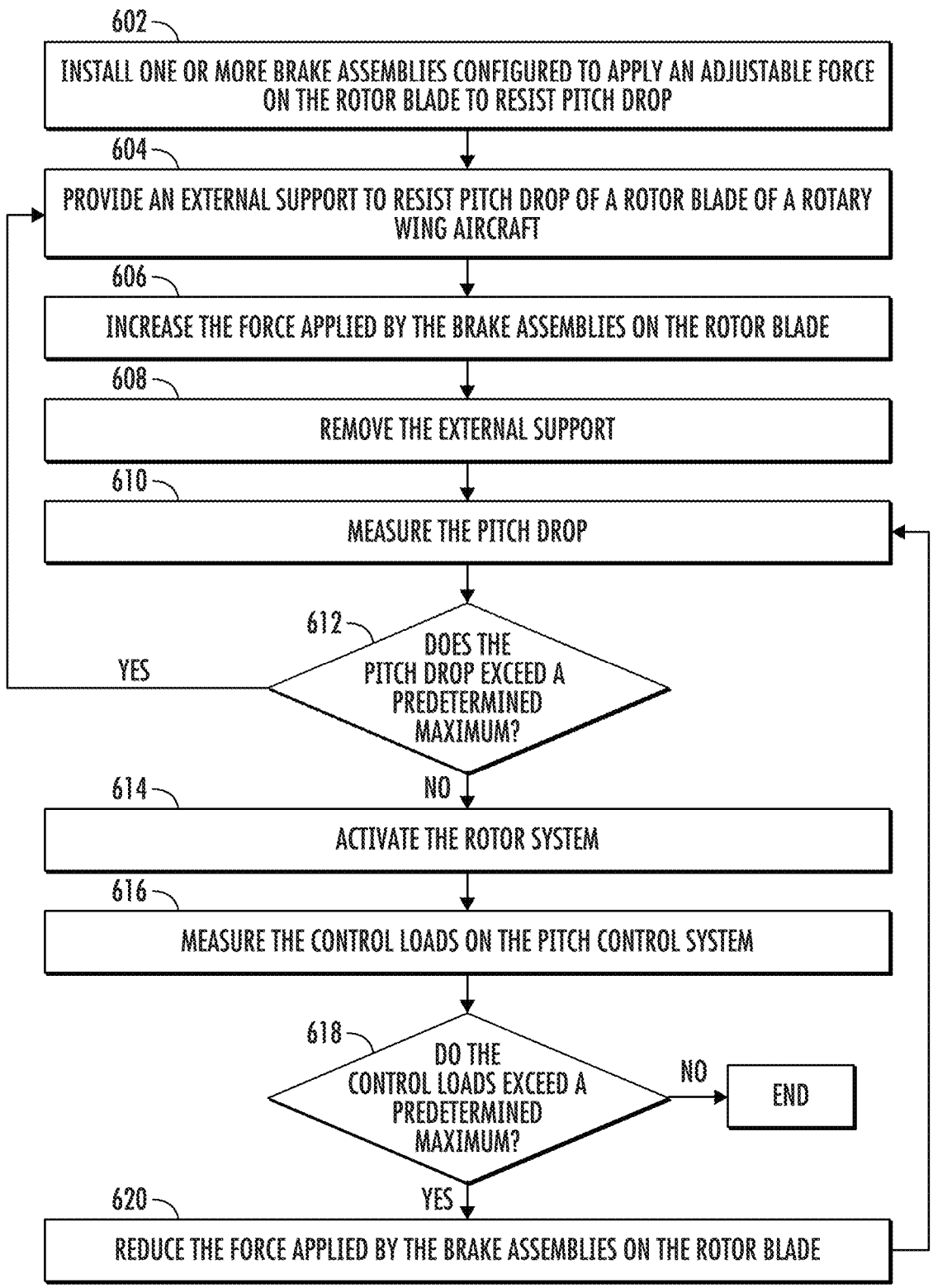
FIG. 6 is a flow diagram of a method of controlling pitch drop of a rotor blade in a rotary wing aircraft, according to some embodiments.

Referring now to FIG. 6, a method 600 of controlling pitch drop of a rotor blade (e.g., rotor blades 34, 38) in a rotary wing aircraft (e.g., aircraft 10) is illustrated, according to some embodiments. At operation 602 of the method 600, one or more brake assemblies (e.g., brake assemblies 204) configured to apply an adjustable force on the rotor blade to resist pitch drop may be installed. For example, the brake assemblies 204 may be installed in an opening 208 in the flange 210 of the rotor blades 34, 38. At operation 604 of the method 600, an external support (e.g., GSE, scaffolding, etc.) to resist pitch drop of the rotor blade may be provided. At operation 606 of the method 600, the force applied by the brake assemblies may be increased. For example, the rods 206 of the brake assemblies 204 may be moved towards the hub arms 108 in the axial direction of the rods 206 by turning the nuts 212, increasing the force of the brake shoes 214 on the rotor blades 34, 38. At operation 608 of the method 600, the external support may be removed such that the external support no longer resists the pitch drop of the rotor blades. At operation 610, the pitch drop of the rotor blades may be measured. The pitch drop may be measured in the degrees of rotation of the rotor blade about the longitudinal axis of the hub arm (e.g., the hub arm 108).

At operation 612 of the method 600, the pitch drop measured at operation 610 may be compared to a threshold pitch drop. For example, at operation 612, it may be determined whether the pitch drop measured at operation 610 exceeds a predetermined threshold, such as a maximum pitch drop. The predetermined maximum pitch drop may be, for example, approximately 1 degree, approximately 2 degrees, approximately 5 degrees, approximately 10 degrees, or another amount of rotation about the longitudinal axis of the hub arm. If it is determined that the pitch drop measured at operation 610 exceeds the predetermined maximum, operations 604-612 may be repeated. The external supports may be reinstalled (operation 604), the force applied by the brake assemblies on the hub arms may be increased (operation 606), the external supports may be removed (operation 608), the pitch drop may be measured (operation 610), and it may be determined whether the pitch drop exceeds the predetermined maximum (operation 612). Operations 604-612 may be repeated each time the pitch drop is determined at operation 612 to exceed the predetermined maximum. The measured pitch drop exceeding the predetermined maximum may indicate that the brake assemblies are not applying sufficient force to reduce the pitch drop to a desired level.

If it is determined at operation 612 that the pitch drop does not exceed the predetermined maximum, the method 600 may proceed to operation 614. At operation 614 of the method 600, the rotor system is activated, causing the rotor blades to rotate about the rotor axis. For example, the rotors 36, 39 may rotate, causing the rotor blades 34, 38 to rotate about the rotor axis, which may cause the tension-torsion straps 138 to stretch, reducing the force of the brake assemblies 204 on the hub arms 108. The rotors 36, 39 may be controlled to rotate fast enough to stretch the tension-torsion straps 138, but not fast enough to lift the aircraft 10 off of the ground. At operation 616 of the method 600, the control loads on the pitch control system may be measured. For example, in the pitch control system 70, the load on the pitch control actuators 80 when adjusting the pitch of the rotor blades 34, 38 may be measured. If the brake assemblies 204 are still applying a force on the hub arms 108, the loads on the pitch control actuators 80 may be increased by the friction caused by the brake assemblies. At operation 618 of the method 600, it may be determined whether the control loads on the pitch control system exceed a predetermined maximum load. If the control loads do not exceed the predetermined maximum, the brake assemblies may be applying an amount of force within an acceptable range, and no further adjustments may be required.

If it is determined at operation 618 that the control loads on the pitch control system exceed the predetermined maximum load, the method 600 may proceed to operation 620. The control loads on the pitch control system exceeding the predetermined maximum may indicate that the brake assemblies are applying too much force on the hub arms. At operation 620 of the method 600, with the rotor system deactivated, the force applied by the brake assemblies on the hub arms may be reduced. For example, the rods 206 of the brake assemblies 204 may be moved away from the hub arms 108 in the axial direction of the rods 206 by turning the nuts 212, reducing the force of the brake shoes 214 on the hub arms 108. The force applied by the brake assemblies on the hub arm may optimally be reduced enough to reduce the control loads on the pitch control system to below the predetermined maximum when the rotors are rotating, while not reducing the force so much that the pitch drop exceeds the predetermined maximum when the rotors are not rotating.

After the force applied by the brake assemblies on the hub arms is reduced at operation 620, operation 610 may be repeated to ensure that force applied by the brake assemblies was not reduced to a point that the pitch drop exceeds the predetermined maximum pitch drop when the rotors are not rotating. With the rotor system deactivated, the pitch drop may again be measured at operation 610. Operation 612 may then be repeated, and it may be determined whether the pitch drop of the rotor blade exceeds the predetermined maximum pitch drop. If the pitch drop does exceed the predetermined maximum pitch drop, operations 604-612 may again be repeated until the pitch drop does not exceed the predetermined maximum. If it is determined at operation 612 that the pitch drop does not exceed the predetermined maximum pitch drop, operations 614-618 may then be repeated until it is determined at operation 618 that the control loads do not exceed a predetermined maximum load. Once the pitch drop is determined at operation 612 to be below the predetermined maximum pitch drop, and the control loads are determined at operation 618 to be below the predetermined maximum load, no further adjustments of the brake assemblies may be required. The method 600 may thus ensure that the force applied by the brake assemblies is adequate to resist pitch drop of the rotor blades when the rotors are not rotating and the pitch control actuators are deactivated. In particular, adequate force can be provided while not causing excessive control loads on the pitch control actuators when the rotors are rotating and the pitch control actuators are activated.

Configuration of Example Embodiments

While this specification contains specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As may be utilized herein, the terms "substantially," "generally," or "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the various systems shown in the various example implementations is illustrative only and not restrictive in character. All changes and modifications that come within the spirit and/or scope of the described implementations are desired to be encompassed. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

What is claimed is:

1. A rotor system of a rotary wing aircraft, the rotor system comprising:
   a rotor hub comprising a hub arm;
   a rotor blade coupling;
   at least one bearing positioned around an inboard end of the rotor blade coupling to enable rotation of the rotor blade coupling relative to the hub arm about a longitudinal axis of the hub arm; and
   a first brake assembly comprising a rod coupled to the rotor blade coupling and a first brake shoe coupled to the rod, the first brake shoe configured to apply a force on the hub arm,
   wherein an axial position of the rod is adjustable to vary the force of the first brake shoe on the hub arm.

2. The rotor system of claim 1, wherein the rod extends through a flange of the rotor blade coupling, the rotor system further comprising a first nut threadedly coupled to the rod on a first side of the flange and a second nut coupled to the rod on a second side of the flange, wherein the axial position of the rod is adjustable by turning the nuts.

3. The rotor system of claim 2, wherein the first brake assembly includes one or more spring washers positioned between the first nut and the flange.

4. The rotor system of claim 3, wherein the flange includes a counterbore, wherein at least one of the spring washers is positioned in the counterbore.

5. The rotor system of claim 1, wherein the first brake shoe is threadedly coupled to the rod.

6. The rotor system of claim 1, wherein the first brake shoe is configured to apply the force to an end face of the hub arm.

7. The rotor system of claim 6, wherein the end face is defined by a bearing retainer.

8. The rotor system of claim 1, wherein the rod is threadedly coupled to the rotor blade coupling, wherein the axial position of the rod is adjustable by turning the rod.

9. The rotor system of claim 1, further comprising a tension-torsion strap coupling the rotor blade coupling to the hub arm.

10. The rotor system of claim 9, wherein the tension-torsion strap is configured to have (i) an initial length when the rotor system is not rotating and (ii) a plurality of expanded lengths due to centrifugal force when the rotor system is rotating, wherein the rod is positionable such that the first brake shoe is in contact with the hub arm when the tension-torsion strap is at the initial length and is out of contact with the hub arm when the tension-torsion strap is stretched to at least one of the expanded lengths.

11. The rotor system of claim 1, further comprising at a second brake assembly comprising a second rod coupled to the rotor blade coupling and a second brake shoe coupled to the second rod, the second brake shoe configured to apply a force on the hub arm, wherein the first brake shoe contacts a top portion of the hub arm and the second brake shoe contacts a bottom portion of the hub arm.

12. A rotary wing aircraft comprising:
  a rotor system comprising:
    a rotor hub comprising a hub arm;
    a rotor blade coupling;
    at least one bearing positioned around an inboard end of the rotor blade coupling to enable rotation of the rotor blade coupling relative to the hub arm about a longitudinal axis of the hub arm; and
    a tension-torsion strap coupling the rotor blade coupling to the hub arm;
  a swashplate assembly comprising a plurality of pitch control actuators configured to control the rotation of the rotor blade coupling;
  an engine or motor configured to rotate the rotor system, wherein the rotation of the rotor system is configured to lift the rotary wing aircraft; and
  one or more brake assemblies each comprising a rod coupled to the rotor blade coupling and a brake shoe coupled to the rod, the brake shoe configured to apply a force on the hub arm to resist a pitch change of the rotor blade coupling, wherein an axial position of the rod is adjustable to vary the force of the brake shoe on the hub arm.

13. The rotary wing aircraft of claim 12, wherein each brake assembly includes one or more spring washers configured to compress when the force is applied on the hub arm.

14. The rotary wing aircraft of claim 12, further comprising a rotor blade coupled to the rotor blade coupling wherein each rod is positionable in (a) a first axial position in which the one or more brake shoes do not contact the hub arm, wherein when the rods are in the first axial position, a drop in pitch of the rotor blade exceeds a predetermined angle under the force of gravity when the pitch control actuators are deactivated and the rotor system is not rotating and (b) a second axial position in which the one or more brake shoes and the tension-torsion strap cooperate to maintain the drop in pitch of the rotor blade below the predetermined angle under the force of gravity when the pitch control actuators are deactivated and the rotor system is not rotating.

15. The rotary wing aircraft of claim 14, wherein the tension-torsion strap is configured such that when the engine is rotating the rotor system at a speed sufficient to lift the rotary wing aircraft, the tension-torsion strap expands such that the one or more brake shoes do not contact the hub arm when the rod is in the second axial position.

16. The rotary wing aircraft of claim 12, wherein the at least one bearing comprises a pair of bearings in an inner cavity of the hub arm, wherein the rotor system further comprises:
  a bearing retainer configured to seal the inner cavity at an outboard end of the hub arm, wherein the one or more brake assemblies are positionable to apply the force to the bearing retainer.

17. A method of controlling a drop in pitch of a rotor blade coupled to a rotor hub of rotary wing aircraft by a tension-torsion strap and a rotor blade coupling, the method comprising:
  coupling a brake assembly to the rotor blade coupling, the brake assembly comprising a rod coupled to a brake shoe; and
  adjusting an axial position of the rod such that the brake shoe applies a force on the rotor hub, the force configured to resist the drop in pitch of the rotor blade, wherein adjusting the axial position of the rod comprises removing at least one external support from the rotor blade to confirm that the drop in pitch of the rotor blade does not exceed a predetermined maximum drop in pitch.

18. The method of claim 17, wherein adjusting the axial position of the rod comprises confirming that control loads on a pitch control system of the rotary wing aircraft do not exceed a predetermined maximum load when the rotor hub is rotating.

19. The method of claim 18, wherein adjusting the axial position of the rod comprises:
  moving the rod towards the rotor hub in response to determining that the drop in pitch exceeds the predetermined maximum drop in pitch; and
  moving the rod away from the rotor hub in response to determining that the control loads on the pitch control system exceed the predetermined maximum load.

\* \* \* \* \*